(12) United States Patent
Hoover

(10) Patent No.: US 7,552,560 B2
(45) Date of Patent: *Jun. 30, 2009

(54) TACKLE CONTAINER WITH NESTING SPACES BETWEEN INTERIOR BARRIERS

(75) Inventor: Ronald D. Hoover, Baton Rouge, LA (US)

(73) Assignee: Plano Molding Company, Plano, IL (US)

( * ) Notice: Subject to any disclaimer, the term of this patent is extended or adjusted under 35 U.S.C. 154(b) by 303 days.

This patent is subject to a terminal disclaimer.

(21) Appl. No.: 11/219,252

(22) Filed: Sep. 2, 2005

(65) Prior Publication Data

US 2006/0053681 A1    Mar. 16, 2006

Related U.S. Application Data

(63) Continuation-in-part of application No. 09/862,890, filed on May 22, 2001, now Pat. No. 6,959,811.

(51) Int. Cl.
*A01K 97/06* (2006.01)
(52) U.S. Cl. ............ 43/57.1; 43/54.1; 206/315.11
(58) Field of Classification Search .......... 43/57.1, 43/57.2, 54.1; 206/315.11
See application file for complete search history.

(56) References Cited

U.S. PATENT DOCUMENTS

| | | | |
|---|---|---|---|
| 10,598 A | 3/1854 | Price | |
| 2,364,807 A | 12/1944 | Nelson | |
| 2,610,430 A | 9/1952 | Neiman | |
| D174,914 S | 6/1955 | McGee | |
| 2,801,492 A | 8/1957 | Katwyk | |
| 3,146,544 A * | 9/1964 | Mackay | 43/57.1 |
| 3,197,915 A * | 8/1965 | Staver | 43/57.1 |
| 3,332,164 A * | 7/1967 | Parrett, Jr. | 43/57.1 |
| 3,346,313 A * | 10/1967 | Fee | 312/234.1 |
| 3,367,062 A * | 2/1968 | Glass | 43/57.1 |
| 3,507,071 A * | 4/1970 | Bryson | 43/57.1 |
| 3,758,977 A | 9/1973 | Miller | |
| 3,948,579 A | 4/1976 | Schirmer | |
| 4,848,585 A | 7/1989 | Snyder | |
| 4,936,044 A * | 6/1990 | Bruce | 43/57.1 |
| 5,289,940 A | 3/1994 | Wisenbaugh | |
| 5,392,557 A | 2/1995 | Harmon | |
| 5,526,927 A | 6/1996 | McLemore | |
| 5,606,820 A | 3/1997 | Suddeth | |
| 5,761,845 A | 6/1998 | Bartholomew | |
| 6,079,148 A | 6/2000 | Yonenoi | |
| 6,219,958 B1 | 4/2001 | Eberts | |
| 6,789,669 B1 * | 9/2004 | Lin | 206/315.11 |

* cited by examiner

*Primary Examiner*—Kurt Rowan
(74) *Attorney, Agent, or Firm*—Vedder Price, P.C.

(57) ABSTRACT

A tackle container with barriers extending across the bottom of the interior cavity holds fishing lures in a fixed position and allows easy retrieval of each lure. Each barrier in the container includes a curved wall that converges with the bottom of the container. The barrier thereby forms a nesting space between the backside of the curved wall and the bottom of the container. A fishing lure fits under a barrier with its hooks wedged into the nesting space to hold the lure in a desired position. The barriers may be removable inserts having rails that slide into slots along the sidewall of the container. The inserts may be positioned in a variety of configurations.

27 Claims, 8 Drawing Sheets

TACKLE CONTAINER WITH NESTING SPACES BETWEEN INTERIOR BARRIERS

CROSS REFERENCE TO RELATED APPLICATIONS

This application is a continuation-in-part of application Ser. No. 09/862,890 filed May 22, 2001 now U.S. Pat. No. 6,959,811, for a "Tackle Container with Nesting Space."

BACKGROUND OF THE INVENTION

Fishing enthusiasts consistently face the problem of baits and lures becoming tangled in tackle boxes. Fishing hooks, lures, and various kinds of baits are often made with thin strips of plastic or metal that tend to intertwine with one another, hindering quick retrieval of one piece of equipment from the box. To alleviate this problem, some fishermen divide their tackle boxes into compartments that allow the fishermen to gather similar lures and hooks into a designated section of the container. Within each section of the container, however, lures and hooks still twist around each other and must be manually separated before use.

Previous tackle boxes and containers have been developed in efforts to alleviate the problem of tangled lures and hooks. For example, U.S. Design Patent No. 174,914 (McGee, 1955) shows a bait box in which the interior is divided into compartments by a plurality of straight walls extending between the outer walls of the container. The walls form individual sections in which lures may be placed, but the compartments do little to alleviate the problem of tangling.

U.S. Pat. No. 3,758,977 (Miller, 1973) discloses removable panels mounted inside a tackle box and pivoting around an axis (i.e., the panels may flip up from one end or lie flat on top of each other). The panels have recesses formed on both sides in which the hook of a lure may rest with its points directed downwardly into the recess. The points of the hook may engage the panel to hold the lure therein. The container is designed so that a lure lying in one of the receptacles may also be held in place by an overlying panel pushing against the lure until that overlying panel is flipped in an upward direction. The Miller '977 patent separates the lures into individual compartments but requires the lure hooks to engage the panel for proper operation.

U.S. Pat. No. 5,392,557 (Harmon, 1995) shows a storage container that prevents hook entanglements by forming a series of "V" shaped storage members spaced apart within the container. A fishing lure slides within the "V" so that its body rests within the vertex of the V-shaped member. Harmon also provides an opening along the vertex of the member so that when the body of the lure rests within the V-shaped member, the lure hooks fall below the member. The Harmon '557 patent separates the hooks of each lure from one another to prevent tangling. The main drawback of the Harmon container is that removing the lures from the slotted member can be cumbersome.

U.S. Pat. No. 6,079,148 (Yonenoi, 2000) provides a mat with grooves cut into sections of the mat. The hooks of a lure slide within the grooves so that the body of the lure rests on the mat. The hooks of a lure can be squeezed between adjacent sections of the mat. The mat of Yonenoi '148 must be connected to a tackle container by adhesives on its underside, which limits its portability from one container to another.

U.S. Pat. No. 2,610,430 (Neiman, 1952) shows another embodiment of a tackle container in which the hooks of a lure are squeezed between sections of a tackle container insert. The inserts of the Neiman '430 patent are fly holding units made of flat strips or ribbons of material compressed to form curved surfaces with slots between each portion of the ribbon. The hooks of a lure fit within the slots so that the body of the lure rests above the slots. The Neiman '430 patent also requires the hooks to fit between compressed slots of the ribbon material. Tackle containers using this type of structure may actually damage the lures and hooks by this compressive force.

Two other United States patents also show tackle containers having grooved receptacles in which the hooks of a lure slide within slots formed in a portion of the container. The body of the lure rests atop the slots as the hooks hang below. U.S. Pat. No. 2,364,807 (Nelson, 1943) and U.S. Pat. No. 5,606,820 (Suddeth, 1997) each provide a tackle container in which the interior of the container has grooved inserts for sliding the hook of the lure therein. These designs allow little flexibility in the size and types of lures that will securely fit within the container. Lures with hooks that do not hang from the bottom of the lure will not be secure in tackle containers that use this type of structure.

U.S. Pat. No. 2,801,492 (Katwyk, 1954) shows another embodiment of a tackle container in which the lures are separated into individual compartments. The Katwyk '492 patent divides the interior of the tackle container into sections by placing parallel walls therein. The container includes bars running perpendicularly to the interior walls. The hooks of the lure are attached to the bars as the body of the lure rests between two walls within one section of the tackle container. The Katwyk '492 container separates the lures to prevent tangling but only accommodates lures of certain sizes and hook positions.

Thus, there exists a need in the field of tackle containers for a new structure that will hold lures and baits and prevent tangling. The new structure should accommodate lures of varying sizes and hook positions and allow the user to customize the interior configuration of the container.

SUMMARY OF THE INVENTION

It is an object of the present invention to provide a tackle container that is capable of storing different kinds of fishing lures and baits within a single container.

It is another object of the present invention to provide a tackle container with a structure that secures lures and baits inside the container so that the container may be carried and moved without tangling the lures and baits.

It is yet another object of the present invention to provide removable inserts that fit within the tackle container of this invention to provide a storage structure for different kinds of fishing lures and baits, particularly crankbait, in a fixed position.

The invention herein meets these objects by providing a tackle container that has an interior compartment with a structure that holds the lures within the container and still allows easy removal of each lure without tangling. The interior of the tackle container includes barriers that extend along the bottom of the container. In one embodiment, each barrier has a curved wall that converges with the bottom of the container to form a nesting space between the barrier and the container bottom. In an alternative embodiment, the barriers curve toward each other with the nesting space between the barriers. The hooks of a lure fit within the nesting space to hold the lure body in place. The barriers hold the lures in a fixed position when the container is moved and allow for easy removal of the lure.

In one embodiment, the barriers within the container are removable inserts that have rails at each end. The sidewalls of the container have corresponding slots around the perimeter of the interior of the container. The rails of the inserts slide within the slots along the sidewall to hold the inserts in place. The inserts may be placed in a variety of configurations for optimal use of the interior of the container.

DETAILED DESCRIPTION

A tackle container (10) according to the present invention is useful for, but not limited to, holding fishing lures (5) that have a body (6) and at least one hook (7). The container is particularly advantageous for holding lures in which a hook is attached to the bottom of the lure.

Figure 1:
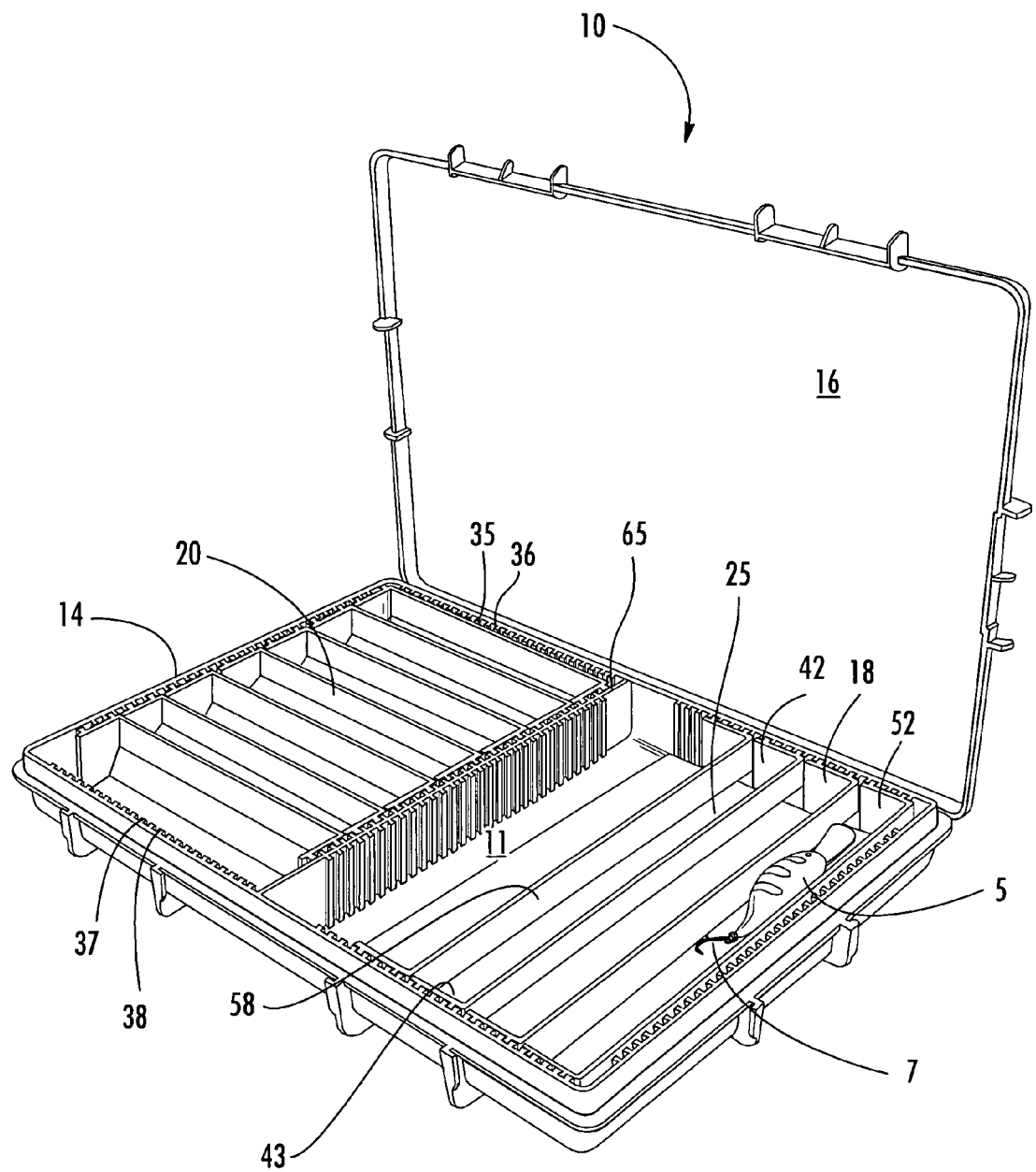
FIG. 1 is a front view of a tackle container according to this invention with barriers affixed to the interior of the container.

One embodiment of this container (10) is shown in detail at FIG. 1 and has a bottom (11) with a continuous sidewall (14) connected to the bottom. The sidewall (14) may be coextensive with the perimeter of the bottom (11) or attached in any other manner that encloses a portion of the bottom (11). The container (10) also includes a hinged lid (16) with fasteners that clamp the lid (16) to the sidewall (14) so that the container (10) may be opened and closed without disturbing its contents.

At least one barrier (18) is connected to the sidewall (14) and extends across the bottom of the container (10) toward an opposite portion of the sidewall (14). The barrier (18) may include a curved wall (20) that converges with the bottom (11) to form a nesting space (25) between the curved wall (20) and the bottom (11). In another embodiment, two barriers may have curved walls that converge toward each other to form a nesting space between barriers.

In describing a barrier (18), the term "curved wall" encompasses any structure with components or sections that extend outside a single plane. The curved wall (20) may be in the form of a simple arc, several connected arcs, or may encompass more than one segment connected at various angles. In a general sense, the curved wall (20) extends downward from a top region toward the bottom (11) of the container. Traveling along points from the top of the curved wall to bottom of the container, the curved wall preferably has at least one change in slope. Accordingly, the upright upper portion of the curved wall has a maximum slope, while at least one area on the lower portion has a flatter slope.

Figure 4:
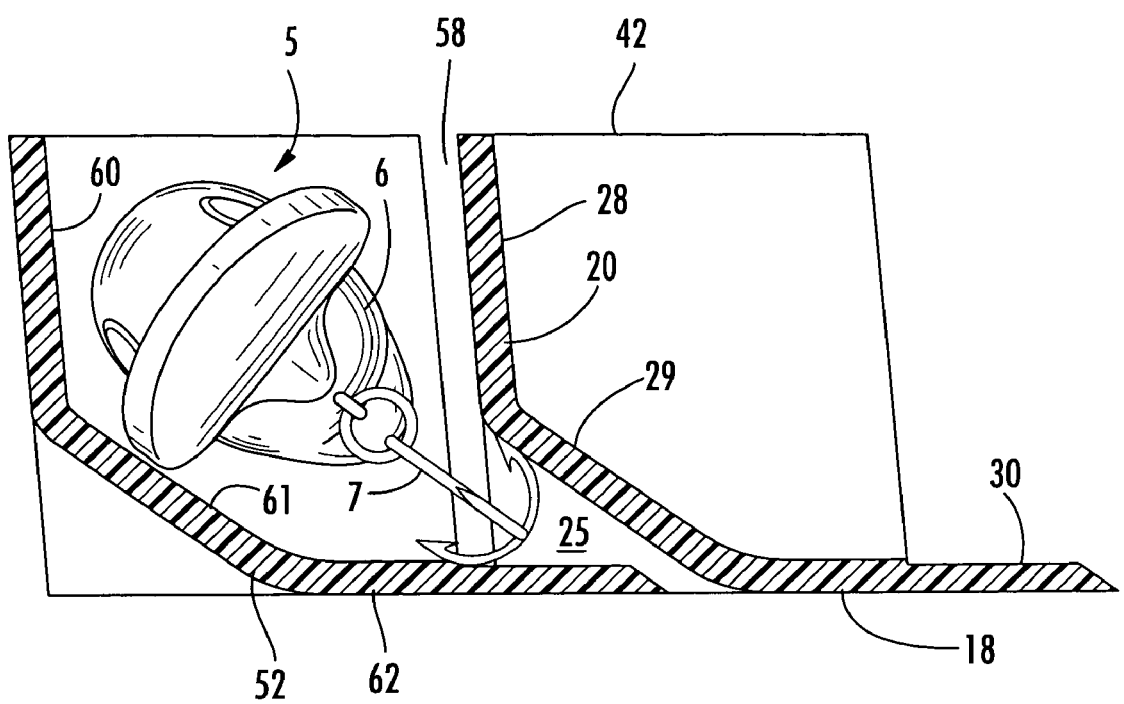
FIG. 4 is a side view of a fishing lure resting between two barriers with the lure hook positioned within the nesting space under one of the barriers.

Those having ordinary skill in the art will appreciate that the term "converges" is intended to describe the barrier as being in close proximity with the container bottom (11) or with a second barrier. In this regard, FIG. 4 shows that the curved barrier need not be integral with the bottom, but near enough to form an effective nesting space.

In one embodiment, the term "nesting space" includes, but is not limited to, that area between the underside of the barrier (18) and the bottom (11) of the container (10). In other words, the curved wall (20) converges with the bottom (11) of the container in either an angled or an arced position. In this configuration of the invention, the nesting space (25) is a generally wedge-shaped area under the barrier (18) between the curved wall (20) and the bottom (11) of the container.

Figure 2:
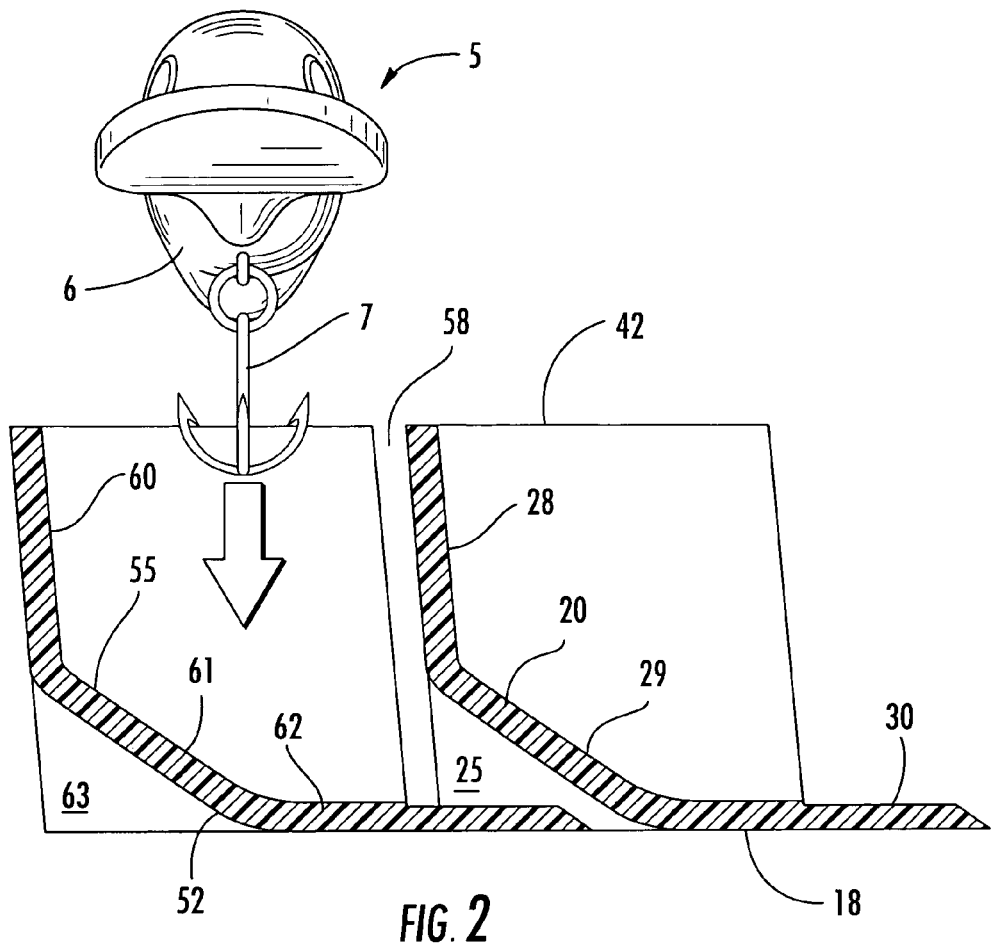
FIG. 2 is a side view of two representative barriers of this invention with a fishing lure entering the channel between the barriers.
Figure 3:
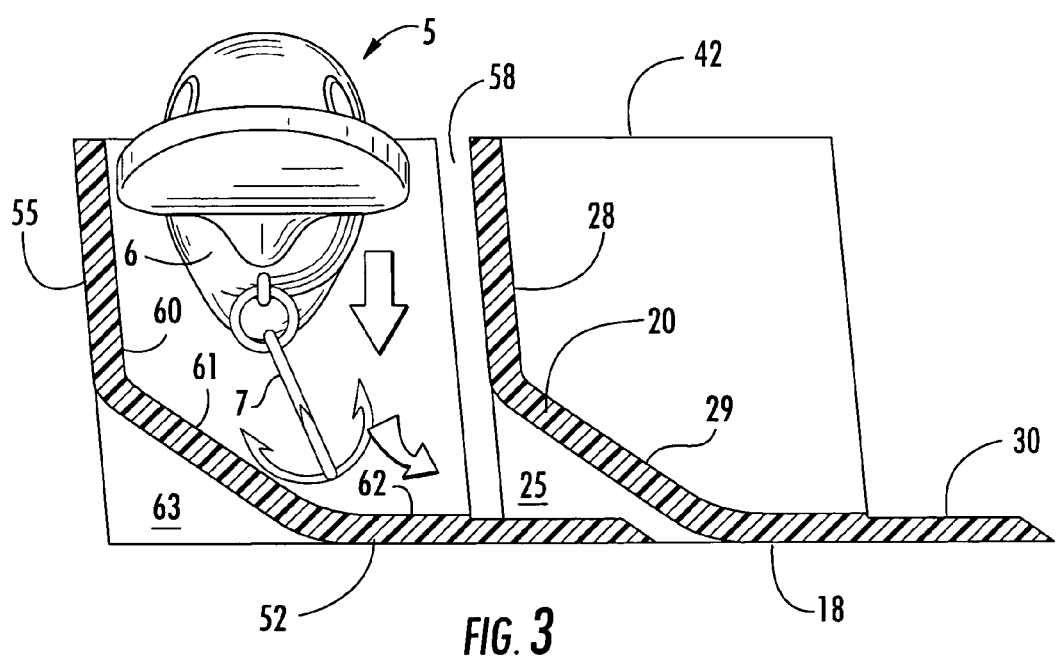
FIG. 3 is a side view of a fishing lure sliding between two barriers of the container.

In operation, a lure hook (7) fits within the nesting space (25) to hold the lure (5) under the barrier (18). FIGS. 2-4 show a side view of a lure sliding into the nesting space (25) under the curved wall (20) of a barrier (18). The barrier (18) holds the lure (5) in place so that a fisherman can move or carry the container (10) without shuffling and tangling all of the lures therein. One can place a series of lures lengthwise under the barrier (18) and hold each lure in place with the hooks resting within the nesting space (25).

The mechanism by which the tackle container (10) of this invention holds the lures in place includes making optimal use of the weight of the lure, the fastening ability of the hook, and the material of the barriers. By sliding the lure under the barrier (18), the weight of the lure (5) presses the lure body (6) into the underside of the barrier (18). The hook (7) wedges itself into the nesting space (25) where it advantageously presses against the curved wall (20) and the bottom of the container (11). The points of the hook (7) may slightly snag the curved wall (20) or may simply rest against the curved wall (20). In any event, the contact between the hook (7) and the curved wall (20) has sufficient friction to restrict the lure's movement and stabilize the position of the hook (7) within the nesting space (25).

The barrier (18) may be made of any material that is sufficiently solid to retain the lures. The barrier (18) may optionally be made of a plastic or other polymer that is molded or otherwise manufactured into the desired shape for the curved wall (20). The hook (7) does not have to puncture the barrier, but the hook may slightly scratch the barrier surface to help hold the hook, and therefore the lure, therein. The lure (5) does not slide or move to any significant degree when placed under the barrier (18).

Figure 5:
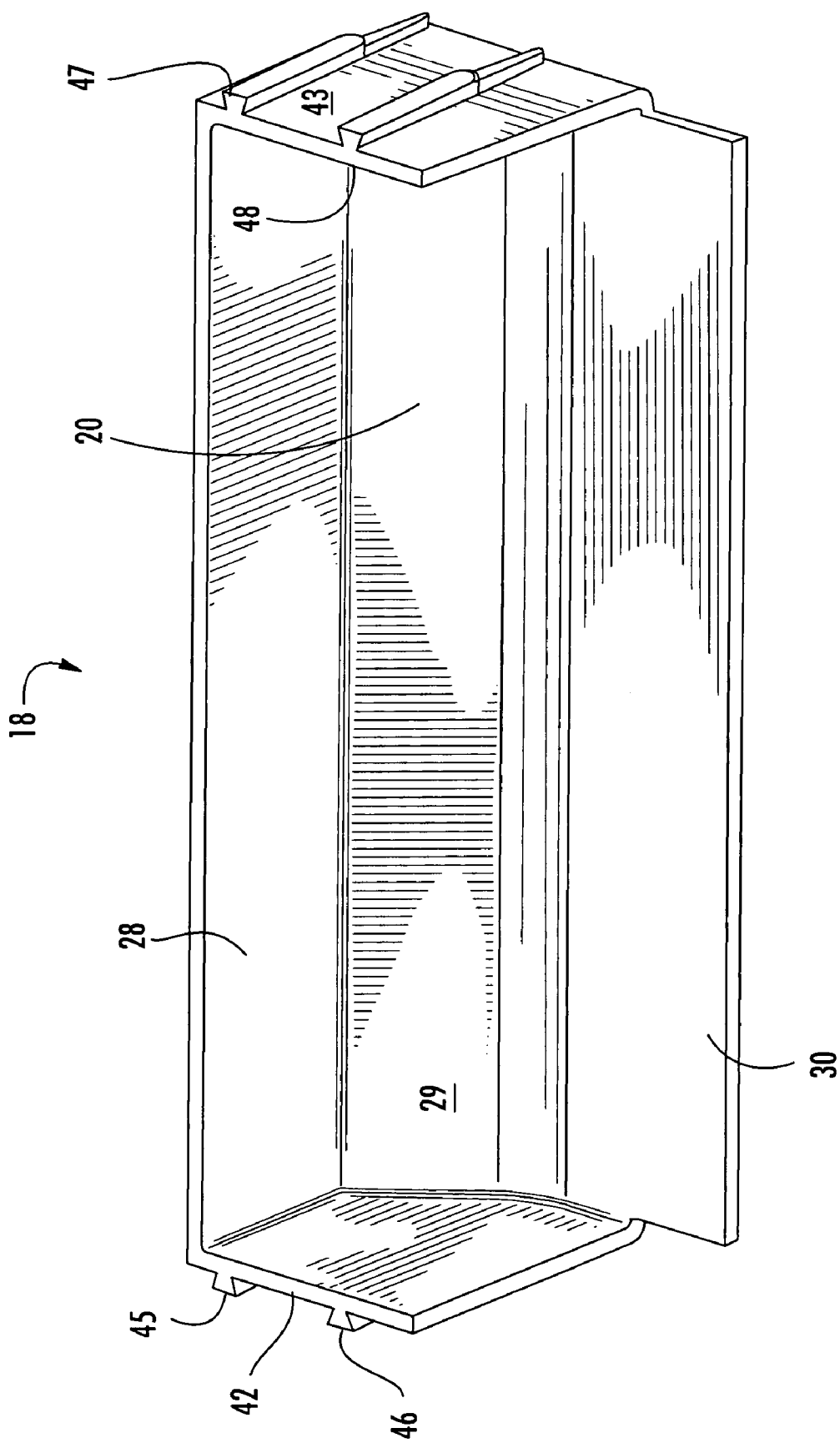
FIG. 5 is a front view of a barrier insert according to this invention.
Figure 6:
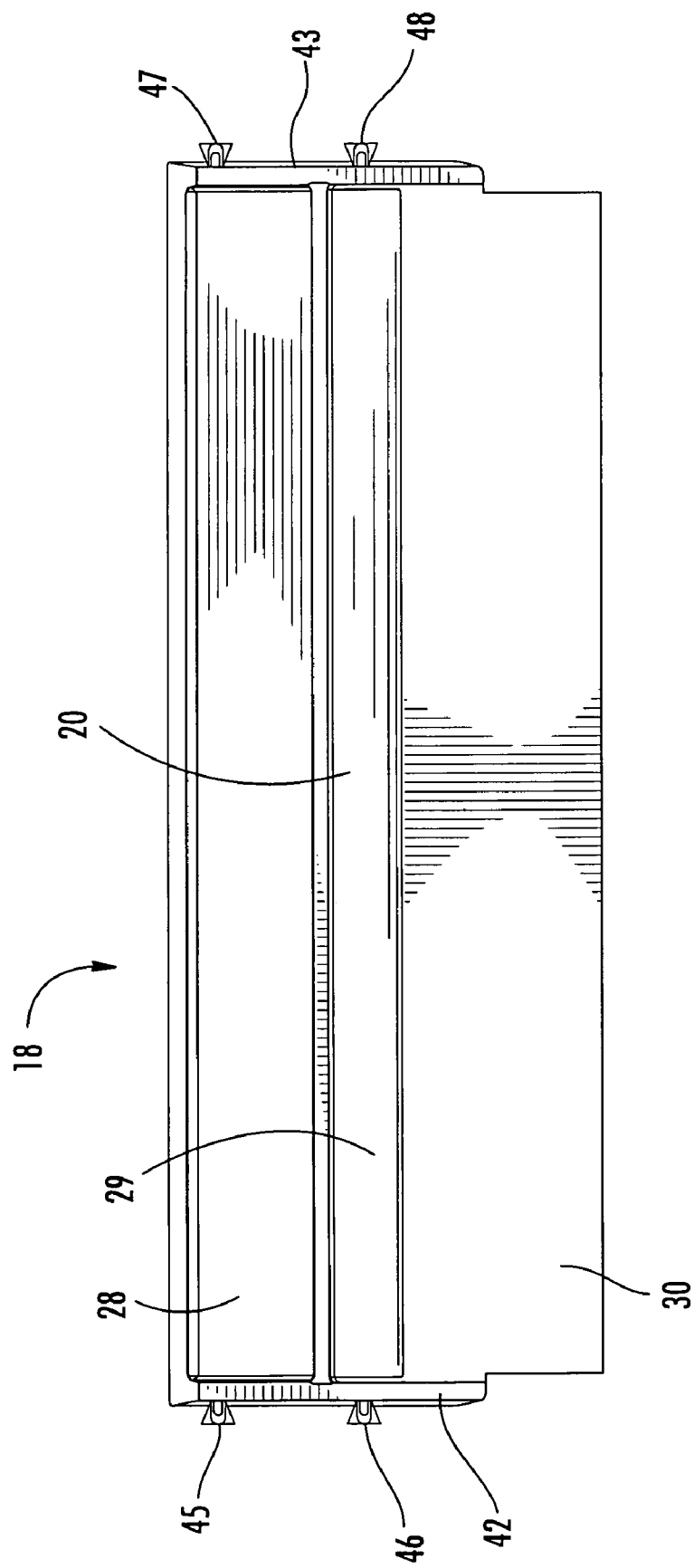
FIG. 6 is a top view of a barrier insert according to this invention.
Figure 7:
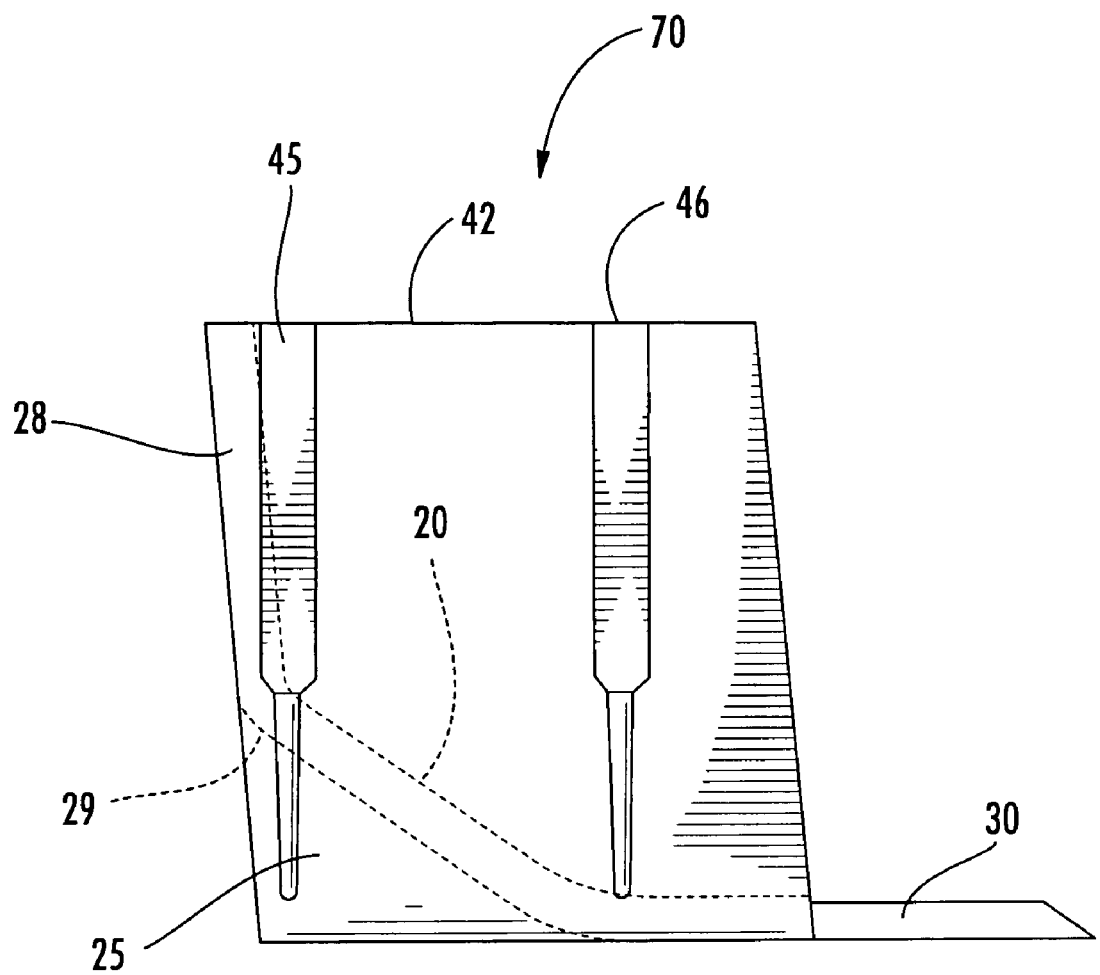
FIG. 7 is a side view of a barrier insert according to this invention.

FIGS. 5-7 show front, top, and side views, respectively, of an exemplary barrier (18) that may be attached to the sidewall (14) and form the nesting space (25) of this invention. The barrier (18) may include elongated planar segments (28, 29, 30) having edges connected at angles so that the barrier (18) is substantially concave.

The container (10) holds more than one barrier (18, 52) positioned side-by-side within the sidewall (14) to hold multiple lures. The side view of two adjacent barriers (18, 52), as shown in FIGS. 2-4, illustrates that the curved walls (20, 55) of each barrier (18, 52) may have a substantially vertical segment (28, 60) attached at an angle to a connector segment (29, 61) that converges with the bottom (11) of the container (10) to form nesting spaces (25, 63) between the curved walls (20, 55) and the bottom (11) of the container (10).

By using more than one barrier, the invention also encompasses an embodiment of the container in which the barriers curve toward one another. In this embodiment, each barrier (18, 52) has an upright upper portion (28, 60) connected to a lower portion (29, 61). The lower portion curves downwardly from the upper portion. In particular, the lower portion of a first barrier may curve toward the lower portion of the second barrier to form a nesting space within the channel between the barriers. In this embodiment, the lure hooks fit between the barriers in the nesting space. The upper portions (28, 60) of each respective barrier define the upper width of the channel. The lower portions (29, 61) of each respective barrier define the nesting space width. In a preferred embodiment, the width of the nesting space is smaller than the upper width of the channel.

The curved wall (20, 55) may optionally include an extension segment (30, 62) extending substantially horizontally from the connector segment (29, 61) and positioned flush with the bottom of the container (11). As shown in FIGS. 2-4, the extension segment (61) of one barrier (52) may reach all the way under the vertical segment (28) and the connector segment (29) of the adjacent barrier (20). In this situation, the nesting space (25) is formed between the extension segment (62) of one barrier and the underside of the adjacent barrier (18).

FIGS. 2-4 show the details of adjacent barriers (18, 52) for attaching to the sidewall (14) of the container (10) and holding lures therein. The barriers (18, 52) are attached to the sidewall (14) side-by-side and form a channel (58) between the two. The lure (5) fits within the channel (58) and rests between the barriers (18, 52).

In embodiments utilizing multiple barriers in the container (10), the container again includes a bottom (11), a continuous sidewall (14) connected to the bottom (11), and at least first and second barriers (18, 52) connected to the sidewall (14). The barriers (18, 52) extend across the bottom (11) of the container (10) and preferably reach from one portion of the sidewall (14) to a directly opposite portion.

As shown in FIGS. 2-4, each barrier has an upright upper portion (28, 60) connected to a lower portion (29, 61). In a preferred embodiment, the lower portion (29, 61) extends downwardly from the upper portion and converges with the bottom (11). The lower portion (29, 61) of the barrier thereby defines a nesting space (25, 63) between the lower portion (29, 61) and the bottom (11). The nesting spaces (25, 63) are of a sufficient size and shape for holding the hook (7) of a lure placed between the barriers (18, 52).

Adjacent barriers (18, 52) define a channel (58) between the barriers. In the preferred embodiment, the body of a lure (6) fits within the channel (58) between the barriers. The lure hook (7) rests within the nesting space (25) under one of the barriers (18, 52), as the body (6) of the lure (5) rests adjacent the other barrier (52). In a different embodiment that also utilizes a nesting space, the adjacent barriers curve downwardly toward one another to form the nesting space between the curved walls of the barriers.

Preferably, the barriers (18, 52) include at least one substantially concave surface to form a nesting space (25, 63) in which the hook rests. The concave surface of the barriers (18, 52), defined by a curved wall (20), prevents the lures from sliding back and forth within the channel. Regardless of whether the barriers (18, 52) are concave, the nesting space (25, 63) of the invention is formed by contouring the shape of the barrier (18, 52). The contours of the barrier walls provide a receptacle for the lure hook (7) to hold the body of the lure (5) in place.

In one embodiment of the invention, the barriers may be curved from the top of the barrier toward the bottom (11) of the container (10). The upper portion (28, 60) of each barrier (18, 52) may be a substantially vertical segment (28, 60) having a planar surface. The lower portion of each barrier (18, 52) would then include a connector segment (29, 61) having a planar surface and attached at an angle to the substantially vertical segment (28, 60). The connector segment (29, 61) converges with the bottom (11) of the container (10) to form the nesting space (25, 63) under each respective connector segment (29, 61).

The lower portion (29, 63) of each barrier (18, 52) may also include an extension segment (30, 62) having a planar surface and extending from the lower end of the connector segment (29, 61) in a position substantially parallel with the bottom (11) of the container (10).

As noted earlier, the barriers (18, 52) of the tackle container (10) are connected to the sidewall (14) to form fixed channels in which lures rest. The barriers (18, 52) may be permanently attached to the sidewall (14) by any known means. In other embodiments, the barriers (18, 52) may be removably attached to the sidewall (14). By designing the container (10) so that the barriers (18, 52) are removable, the user has more options in positioning each barrier. This gives the container a modular feature so that the number and spacing of the barriers can be optimized for the use at hand.

Figure 8:
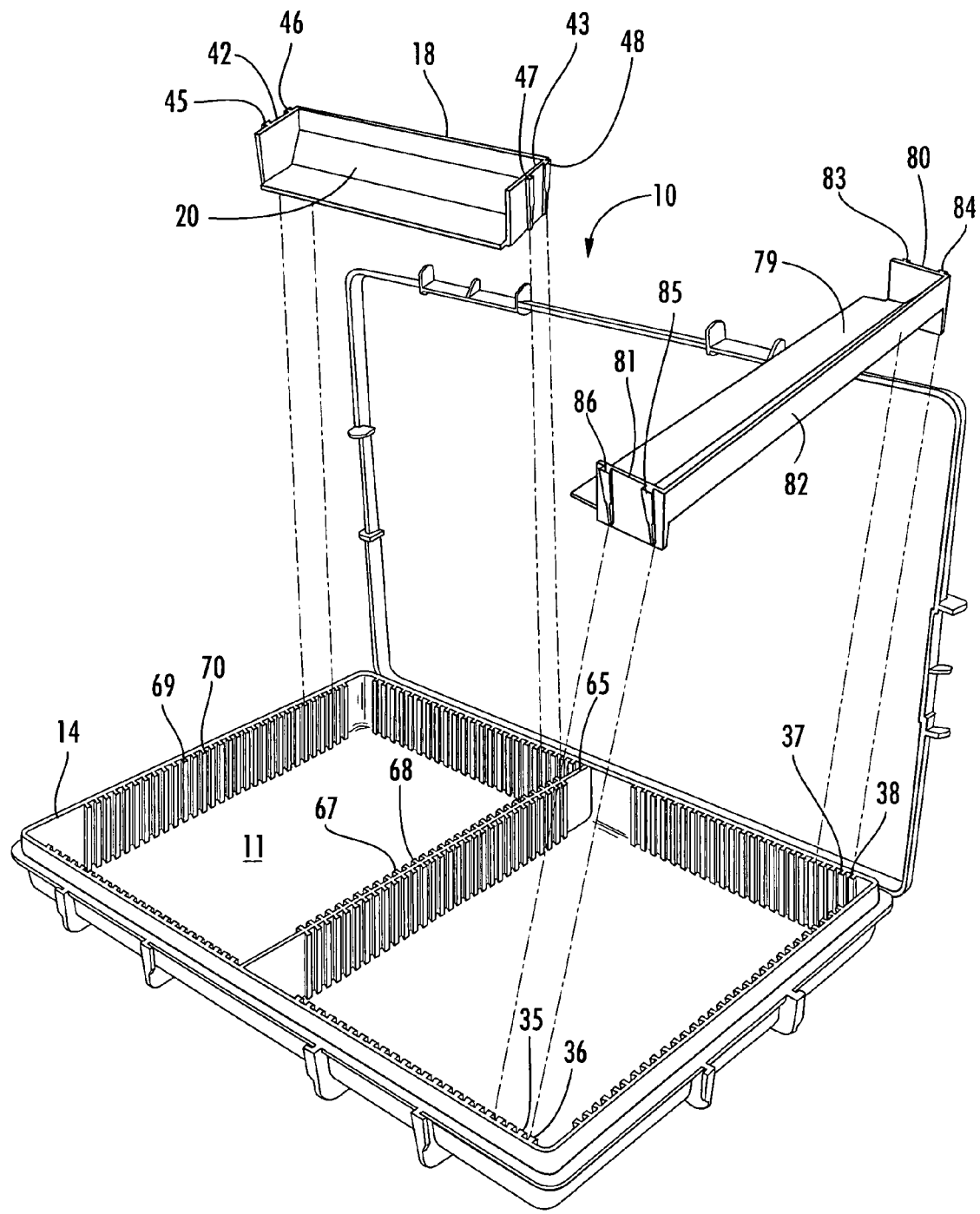
FIG. 8 is a top view of a tackle container having slots that accommodate rails for holding a barrier insert according to this invention.

As shown in FIG. 8, to hold the barriers (18, 79) in position while allowing easy removal, the sidewall (14) includes a plurality of pairs of substantially vertical ribs (35-38) defining pairs of aligned slots across the bottom (11) from one another. In this embodiment, the barriers (18, 79) have substantially vertical rails (45-48; 83-86) on either end of the barrier (18, 79). The rails (45-48; 83-86) slide between the ribs (35-38; 67-70) on the sidewall (14) to hold the barriers (18, 79) in a fixed position within the container (10).

For added support to the rails on the outside of each barrier, the barriers (18, 79) may have a substantially vertical end wall (42, 43, 80, 81) connected to the curved wall (20, 82). The end wall (42, 43, 80, 81) supports the substantially vertical rail (45-48; 83-86) on the outside of the end wall. Each vertical rail slides between one pair of vertical ribs (35, 36) on the sidewall (14) to hold the barrier (18) within the container (10).

Each end wall (42) may optionally include a second substantially vertical rail (46) on the outside of the end wall (42) and opposite the curved wall (20) of the barrier (18). Overall, the pairs of vertical rails (45-48) on a barrier (79) slide between corresponding pairs of ribs (35-38) on opposite sides of the sidewall (14) to hold each barrier (18) in a fixed position.

As shown in FIG. 8, the tackle container (10) according this invention may also include a partition (65) extending across the bottom (11) of the container (10). The partition (65) may be connected at each end to opposite sections of the sidewall (14). Typically, the partition (65) divides the container (10) into two equal portions.

The partition (65) may include a plurality of pairs of vertical ribs (67, 68) on the partition to define slots on the partition (65) aligned with slots on the sidewall (14). In one embodiment, as shown in FIG. 8, the pairs of rails (45-48) on each end wall (42, 43) of the barrier (18) removably slide between corresponding pairs of ribs (69, 70) on the sidewall (14) and pairs of ribs (67, 68) on the partition (65) to hold the barrier (18) in place within the container (10). Barriers also fit in the other direction on the opposite side of the partition (65). In particular, a barrier (79) may extend from one side wall to the other, parallel to the partition (65). The container (10), therefore allows for organizing lures of different shapes and sizes on either side of the partition (65). The barriers may be spaced apart at desired intervals for various lure shapes and sizes.

Figure 9:
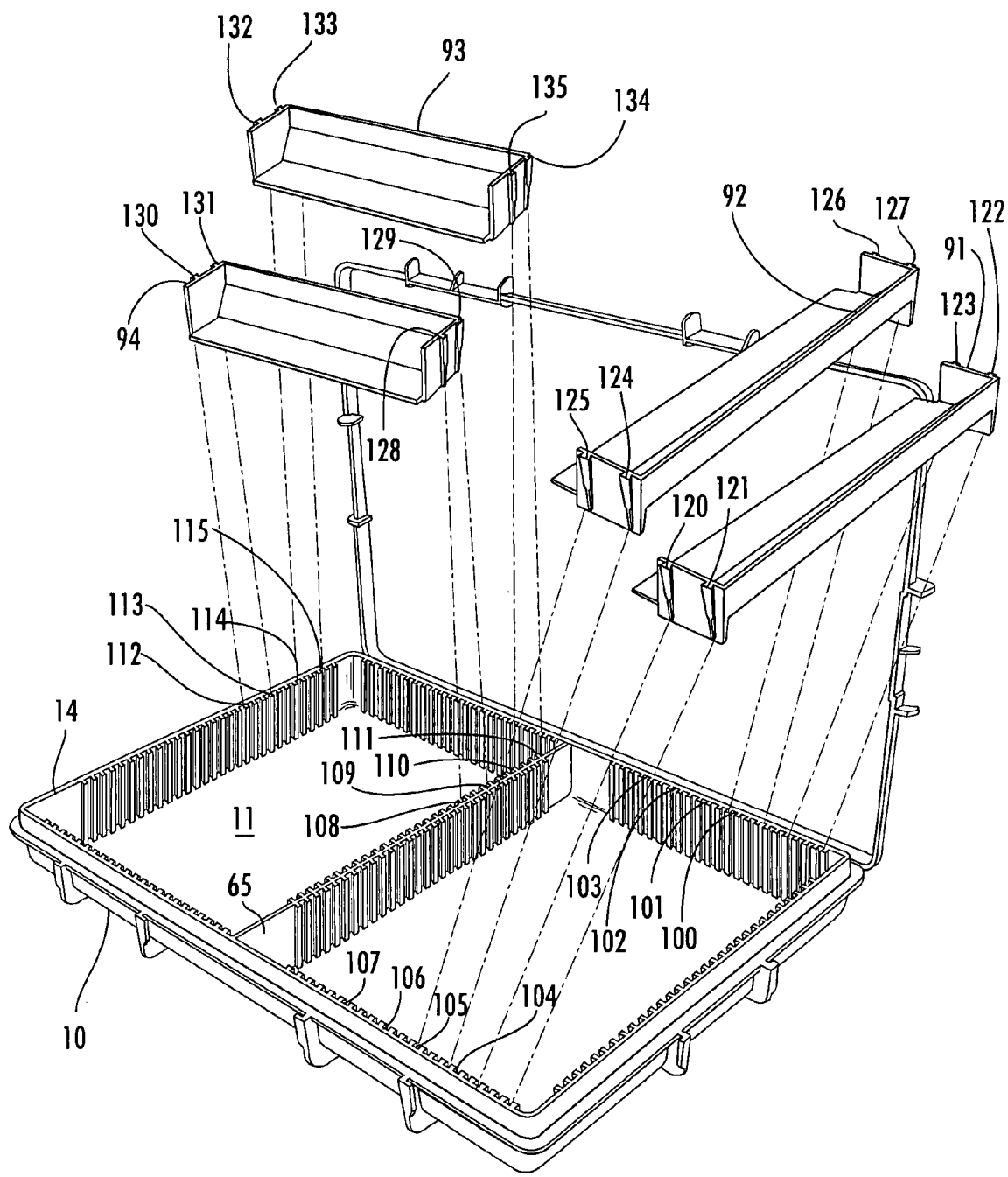
FIG. 9 is a top view of a tackle container having multiple barrier inserts in more than one orientation for holding lures of different shapes and sizes within the container.

As shown in FIG. 9, the tackle container of this invention may utilize the above described barriers (18, 52, 79) in the form of inserts (91-94) that removably fit within the container (10). Pairs of substantially vertical ribs connected to the sidewalls of the container define a plurality of slots (100-115) around the sidewall (14). Each pair of ribs is aligned with an opposite pair of ribs on the sidewall (14). The ribs along the sidewall (14) define slots (100-115) that are aligned across the bottom (11) of the container (10) from one another.

The tackle container includes at least first and second inserts (91, 92) extending across the bottom (11). As described above, each insert includes a curved barrier converging at an angle with the bottom (11) of the container (10).

Each insert (91, 92) has a substantially vertical rail on at least one end of each respective insert. The vertical rails (120-135) removably slide between a respective pair of ribs to secure each insert (91, 92) to the sidewall such that the curved barriers form a channel with a nesting space between said inserts. The channels and the nesting spaces have been explained in detail above. That description will not be repeated but is incorporated for the embodiment of FIG. 9 as if fully set forth below.

As in prior embodiments, the body of a lure fits within the channel between the curved barriers of the inserts (91, 92). The lure hook rests within the nesting space under one of the inserts as the body of the lure rests adjacent the other insert.

FIG. 9 also shows that inserts (93, 94) may be of a size that conveniently fits between the partition (65) and the sidewall (14). These inserts (93, 94) form channels that run perpendicularly to the partition (65). Again, the inserts (93, 94) are removable. The channel between the inserts can be easily resized by moving the inserts (93, 94) into different slots.

The features described above in regard to the barriers (18, 52) are equally applicable to embodiments of the tackle container that utilize inserts (91-94). Descriptions of those features (e.g., the nesting space, the channel, end walls, and rails) will not be repeated but are incorporated as if set forth fully herein.

In the drawings and specification, there have been disclosed typical embodiments of the invention and, although specific terms have been employed, they have been used in a generic and descriptive sense only and not for purposes of limitation, the scope of the invention being set forth in the following claims.

The invention claimed is:

1. A tackle container for holding fishing lures, each lure having a body and at least one hook, the container comprising: a bottom; a continuous sidewall connected to said bottom; and a barrier connected to said sidewall and extending across said bottom, said barrier comprising a curved wall that converges with said bottom to form a nesting space between said curved wall and said bottom, wherein a lure hook fits within the nesting space to hold the lure under said barrier,
wherein said sidewall comprises a plurality of pairs of substantially vertical ribs defining pairs of aligned slots across said bottom from one another and wherein said barrier further comprises a substantially vertical end wall connected to said curved wall, said end wall comprising a substantially vertical rail opposite said curved wall on the outside of said end wall, wherein said rail removably fits between a pair of vertical ribs on said sidewall to hold said barrier within the container.

2. A tackle container according to claim 1, wherein said curved wall comprises elongated planar segments having edges connected at angles so that said barrier is substantially concave.

3. A tackle container according to claim 1, wherein said curved wall comprises a substantially vertical segment attached at an angle to a connector segment that converges with said bottom to form a nesting space between said curved wall and said bottom.

4. A tackle container according to claim 3, wherein said curved wall comprises an extension segment extending substantially horizontally from said connector segment and positioned flush with said bottom.

5. A container according to claim 1, wherein said sidewall comprises a plurality of pairs of substantially vertical ribs defining pairs of aligned slots across said bottom from one another.

6. A container according to claim 1, wherein said end wall comprises a second substantially vertical rail opposite said curved wall on the outside of said end wall.

7. A container according to claim 6, wherein said barrier further comprises a second end wall connected to the end of said curved wall opposite said end wall.

8. A container according to claim 7, wherein said second end wall comprises a third substantially vertical rail opposite said curved wall on the outside of said second end wall.

9. A container according to claim 8, wherein said second end wall comprises a fourth substantially vertical rail opposite said curved wall on the outside of said second end wall.

10. A container according to claim 9, wherein the pairs of rails on each end wall removably slide between corresponding pairs of ribs on said sidewall to hold said barrier in place within the container.

11. A container according to claim 1, further comprising a second barrier connected to said sidewall and extending across said bottom, said second barrier comprising a second curved wall that converges with said bottom under said curved wall of said barrier to form a nesting space between said curved wall and said second curved wall, wherein the lure hook fits within the nesting space to hold the lure between said barrier and said second barrier.

12. The tackle container according to claim 11, wherein said barrier and said second barriers define a channel between said barriers.

13. The tackle container according to claim 12, wherein the body of a lure fits within the channel between said barriers, and the lure hook rests within the nesting space under one of said barriers as the body of the lure rests adjacent the other barrier.

14. The tackle container according to claim 11, wherein said barrier and said second barriers are substantially concave.

15. The tackle container according to claim 11, wherein said barrier and said second barriers are curved from the top of the baffler toward said bottom of the container.

16. A tackle container for holding fishing lures, each lure having a body and at least one hook, the container comprising: a bottom; a continuous sidewall connected to said bottom; and first and second barriers connected to said sidewall and extending across said bottom, each said barrier comprising an upright upper portion connected to a lower portion, said lower portion extending downwardly from said upper portion and converging at an angle with said bottom, thereby defining a nesting space between said lower portion and said bottom, wherein said sidewall comprises a plurality of pairs of substantially vertical ribs defining pairs of aligned slots across said bottom from one another, and wherein at least one of said barriers further comprises a substantially vertical end wall connected to said barrier, said end wall comprising a substantially vertical rail on the outside of said end wall, wherein said rail slides between a pair of vertical ribs on said sidewall to hold said barrier within the container.

17. A tackle container according to claim 16, wherein said end wall comprises a second substantially vertical rail on the outside of said end wall.

18. A tackle container according to claim 17, wherein said insert further comprises a second end wall connected to the end of said barrier opposite said end wall.

19. A tackle container according to claim 18, wherein said second end wall comprises a third substantially vertical rail on the outside of said second end wall.

20. A tackle container according to claim 19, wherein said second end wall comprises a fourth substantially vertical rail on the outside of said second end wall.

21. A tackle container according to claim 20, wherein the pairs of rails on each end wall removably slide between corresponding pairs of ribs on said sidewall to hold said barrier in place within the container.

22. A tackle container according to claim 20, further comprising a partition extending across said bottom and connected at each end to opposite sections of said sidewall.

23. A tackle container according to claim 22, wherein said partition comprises a plurality of pairs of vertical ribs on said partition defining slots on said partition aligned with slots on said sidewall.

24. A tackle container according to claim 23, wherein the pairs of rails on each end wall removably fit between corresponding pairs of ribs on said sidewall and said partition to hold said barrier in place within the container.

25. A tackle container according to claim 16, wherein said first and second barriers define a channel there between.

26. A tackle container according to claim 25, wherein said lower portion of said first barrier curves toward said lower portion of said second barrier to define a nesting space within the channel between said barriers.

27. A tackle container according to claim 26, wherein the channel between said barriers accommodates a lure having a body and at least one hook, wherein the lure hook fits within the nesting space to secure the hook between the barriers.

* * * * *